3,377,189
FURFURAL RESIN COATED SILICEOUS MATERIAL AND PROCESS OF MAKING SAME
Ellsworth G. Acker, Baltimore, Md., assignor to W. R. Grace & Co., a corporation of Connecticut
No Drawing. Continuation-in-part of application Ser. No. 187,924, Apr. 16, 1962. This application Oct. 1, 1964, Ser. No. 409,937
8 Claims. (Cl. 117—62)

ABSTRACT OF THE DISCLOSURE

An organophilic particulate silica or clay material which is characterized by a polymerized furfural surface coating and a method of preparing this material. The process is characterized by the polymerization of furfural on the surface of the particulate silica or clay under conditions of heat and pressure without the use of a catalyst.

---

This application is a continuation-in-part of application Serial No. 187,924 filed April 16, 1962, and now abandoned.

This invention relates to organophilic siliceous material. In one specific aspect, it relates to silica or kaolin type clay treated to render it organophilic and to a method of carrying out such treatment.

The advantages of clays and silicas as fillers and thickening agents in plastics, rubbers, ink and other similar materials are well recognized. The fillers impart varied desirable properties to the materials in which they are used as fillers. Because of their low cost, clay and silica are desirable as fillers. Unfortunately, they are wet with difficulty by organic materials and therefore must be dispersed by some means through the organic material.

It would be desirable to have organophilic fillers which would be easily wet by the organic medium in which they are acting as fillers and therefore would disperse easily.

It is an object of this invention to make organophilic clays and silicas.

It is also an object of this invention to make an inexpensive material suitable as a filler for rubbers, plastics, inks and other similar materials.

I have found that a resinous coating of furfural can be applied to kaolin type clays and to certain silicas to render these materials organophilic. My invention covers a process for effecting this reaction. This process involves polymerizing furfural in contact with the substrate whereby an organophilic resin is deposited in and/or on the substrate. This coating renders the substrate likewise organophilic. The material is recovered as a finely divided solid which is easily dispersed in organic media.

Clays useful in this invention include the kaolin type such as kaolinite, dickite, nacrite, anauxite, halloysite and endilite. Silicas useful include the commercially available filler type silicas.

Commercially available clays and silicas to be used as fillers are generally in the 1–5 micron particle size range. I have found these to be excellent starting materials for my product. However, the invention is applicable to larger or smaller material such as silicas in the sub-micron range of about 20 to 40 millimicrons. Surface area of the silica used generally has a surface area of about 1 to 900 m.²/g. While furfural should be relatively pure, it is not necessary to use reagent grade. Commercially available practical grade has been found to be quite suitable for the present invention. I have used both freshly distilled and undistilled furfural in the practice of my invention and have found both satisfactory.

To prepare the organophilic products of my invention, a slurry of the selected substrate and an excess of furfural is heated in an autoclave between 175°–300° C. for 2–8 hours. The pressure should be maintained at about, but preferably above, 100 p.s.i.g., although I have obtained some in situ-polymerization at pressures as low as 20 p.s.i.g.

For best results, the ratio of furfural to silica should preferably exceed 2 to 1. At a 2 to 1 ratio, a good product is obtained using temperatures between 250°–275° C. with pressures between 150–180 p.s.i.g. and a reaction time of 2 to 4 hours. At higher ratios, temperatures as low as 175° C. can be used. If lower ratios are used, slightly higher temperatures and longer reaction times are required to get an organophilic product.

If kaolin type clay is used as the substrate, the furfural to clay ratio should preferably be above 1.3 to 1. At 1.3 to 1, a desirable product is obtained with temperatures of 250–275° C., pressures of 150–200 p.s.i.g. and a reaction time of about 2–4 hours. If other ratios of furfural to clay are used, the variance in time and temperature described for the silica can be expected.

The treated clay or silica is collected, usually on a filter, air dried, then degassed, i.e., freed of unpolymerized furfural at elevated temperatures under slightly reduced pressure. Temperatures of about 200–250° C. and about 1 mm. Hg pressure are usually adequate for degassing. Degassing can also be accomplished by passing a flow of an unreactive gas such as nitrogen through a bed of the material heated to 200–250° C. until all the unpolymerized material has been removed. After the degassing step, the coated clay or silica is removed from the degassing vessel and its organophilic properties determined using the following technique:

An 0.25 to 0.5 gram sample of the coated material is placed in a 30 ml. 6-inch-long test tube containing 10 ml. of distilled water plus 10 ml. of n-butanol. The test tube is stoppered and given 5 vigorous shakes. If the coated material collects in the n-butanol layer, it is said to be organophilic. The test is conducted at room temperature.

The product of my invention is recovered as a finely divided resin coated solid material with essentially no agglomeration of the particles. The particle size of the product is essentially the same as that of the starting material, that is about 1 to 5 microns or the submicron range of about 20 to 40 millimicrons.

Both furfural resin-coated silicas and clays are black in color. They resemble carbon black in appearance and exhibit similar properties when shaken in various two-phase aqueous-organic systems. For example, when a small amount of organophilic solid is shaken in a 50–50 mixture of water and xylene, the solid collects in the organic layer. After standing for several hours, it collects at the interface of the two phases. On further standing (several days) and with a gentle stir, the material settles into the aqueous layer. This shows that the materials are somewhat hydrophobic as well as organophilic.

This invention will be further explained by the following specific but non-limiting examples.

EXAMPLE I

A 15 gram portion of a commercially available pigment grade silica having a particle size range of 20–40 millimicrons and a surface area of 167 m.²/g. and 15 grams of freshly distilled furfural were heated in an autoclave at 250° C. for 4 hours. A pressure of 110 p.s.i.g. developed in the autoclave. The material was allowed to cool to room temperature inside the autoclave and the excess furfural was drained off. The material was then removed and air dried overnight. The dried product was degassed at 200° C. for ½-hour at 1 mm. Hg and was recovered as a finely divided solid.

Analytical determinations were made on the coated product with the following results:

24.91% total volatiles,
15.20% carbon,
9 furfural groups/mu².

Total volatiles were determined by heating a weighed sample at 1750° F. for ½-hour and reweighing. Carbon was determined by a standard combustion method. The number of furfural groups/mu² was calculated according to the following formula:

$$\frac{\frac{\text{percent C}}{60} \times 6.02 \times 10^{23} \times 100}{[100 - \text{T.V.}][\text{Surface area (m.}^2/\text{g.}) \times 10^{20}] \text{H}_2\text{O}} = \text{No. furfural groups/mu}^2$$

The product was determined to be organophilic by the test described previously.

EXAMPLE II

A 150 gram charge of a commercially available pigment grade silica having a particle size range of 20–40 millimicrons and a surface area of 167 m.²/g. and 300 grams of freshly distilled furfural were heated in an autoclave at 275° C. for 4 hours. A pressure of about 180 p.s.i.g. developed during the reaction. The material was allowed to cool to room temperature inside the autoclave and the excess furfural drained off. The coated silica was then removed from the autoclave and air dried overnight. The dried product was degassed at 200° C. for ½ hour at 1 mm. Hg. Analytical evaluation, determined as described in Example I, was as follows:

18.61% total volatiles,
9.60% carbon,
5.9 furfural groups/mu² surface.

The finely divided particulate was determined to be organophilic by the test described previously.

EXAMPLE III

A total of 100 grams of a commercially available pigment-grade silica having a particle size range of 20–40 millimicrons and a surface area of 167 m.²/g. and 300 grams of freshly distilled furfural were heated in an autoclave at 275° C. for 4 hours. The pressure rose to 130 p.s.i.g. during this period. The material was allowed to cool to room temperature inside the autoclave and the excess furfural was drained off. The coated silica was then removed from the autoclave and air dried overnight. The dried product was degassed at 200° C. for ½-hour at 1 mm. Hg. Analytical evaluation, determined as described in Example I, was as follows:

23.71% total volatiles,
14.40% carbon,
8.8 furfural groups/mu² surface.

EXAMPLE IV

This run was made using 15 grams of a commercially available pigment-grade silica having a particle size range of 20–40 millimicrons and a surface area of 167 m.²/g. and 50 g. of undistilled furfural. The reactants were heated in an autoclave at 250° C. for 4 hours with a pressure of 200 p.s.i.g. developing over that period. The material was allowed to cool inside the autoclave and the excess furfural was drained off. The silica was then removed from the autoclave and air dried overnight. The dried product was degassed at 200° C. for ½-hour at 1 mm. Hg. Analytical evaluation, determined as described in Example I, was as follows:

42.18% total volatiles,
30.4% carbon,
19 furfural groups/mu² surface.

The product was organophilic according to the test described previously.

EXAMPLE V

The reaction was repeated using clay instead of fine silica as the raw material. Thirty grams of a commercially available kaolin clay having a particle size range of 1–5 microns, and 30 grams of freshly distilled furfural were heated in an autoclave at 250° C. for 4 hours. The pressure increased to 150 p.s.i.g. during this period. The material was allowed to cool to room temperature inside the autoclave and the excess furfural drained off. The coated clay was then removed from the autoclave and air dried overnight. The dried product was degassed at 200° C. for ½-hour at 1 mm. Hg. Analytical evaluation, determined as described in Example I, was as follows:

22.55% total volatiles,
8.40% carbon,
39 furfural groups/mu² surface.

The finely divided product was determined to be organophilic by the test described previously.

EXAMPLE VI

The clay run described in Example V was repeated using a different ratio of furfural to clay. In this run, 300 grams of a commercially available kaolin clay having a particle size range of 1–5 microns and 400 grams of undistilled furfural were heated for 4 hours in an autoclave at 275° C. and a pressure of 200 p.s.i.g. developed. The material was then cooled to room temperature inside the autoclave and the excess furfural drained off. The coated clay was then removed from the autoclave and air-dried overnight. The dried product was degassed at 200° C. for ½-hour at 1 mm. Hg. Analytical evaluation, determined as described in Example I, was as follows:

22.10% total volatiles,
7.60% carbon,
35 furfural groups/mu² surface.

The product was organophilic according to the test described previously.

EXAMPLE VII

Another portion of clay product was prepared using 25 grams of a commercially available kaolin clay having a particle size range of 1–5 microns and 100 grams of freshly distilled furfural. The reactants were heated in an autoclave at 250° C. for 4 hours during which a pressure of 200 p.s.i.g. developed. The material was allowed to cool to room temperature inside the autoclave and the excess furfural drained off. The clay was then removed from the autoclave and air-dried overnight. The dried clay was degassed at 200° C. for ½-hour at 1 mm. Hg. Analytical evaluation, determined as described in Example I, was as follows:

41.52% total volatiles,
25.20% carbon,
100 furfural groups/mu² surface.

The product was determined to be organophilic by the test described previously.

EXAMPLE VIII

The affinity of the product for organic materials other than butanol was determined:

A portion of the coated silica prepared in Example I was degassed at 250° C. at 10 mm. Hg for ½-hour.

The material was found to be organophilic in each of the following organic liquids: furfural, xylene, styrene, oleic acid, aniline, paraffin and ethyl ether.

The organophilic properties were determined by the same test described previously except that 10 ml. of each of the above liquids were used in place of the n-butanol in the standard test.

What is claimed is:

1. A process for producing finely divided organophilic silica comprising the steps of mixing furfural with silica having a surface area of from 1 to 900 square meters per gram, and a particle size in the range of from 20 to 40 millimicrons and from 1 to 5 microns, heating said mixture at a temperature between 175 to 300° C. and at a pressure of at least 20 p.s.i.g. for a time sufficient to cause polymerization of the furfural on the surface of said silica, separating the finely divided organophilic silica product from the unreacted furfural, drying, degassing at an elevated temperature under reduced pressure and finally recovering the coated product.

2. A process for producing finely divided organophilic silica comprising the steps of mixing furfural with adsorbent silica, having a surface area of from 1 to 900 square meters per gram and a particle size in the range of from 20 to 40 millimicrons and from 1 to 5 microns, in at least a 2 to 1 ratio of furfural to silica, heating said mixture at temperatures between 175 and 300° C. at a pressure of at least 100 p.s.i.g. for 2 to 8 hours thereby causing polymerization of the furfural on the surface of said silica, separating the finely divided organophilic silica product from the unreacted furfural, drying, degassing at an elevated temperature by treatment with unreactive gases and finally recovering the product.

3. A process for producing finely divided organophilic silica comprising the steps of mixing furfural with adsorbent silica, having a surface area of from 1 to 900 square meters per gram and a particle size in the range of from 20 to 40 millimicrons and from 1 to 5 microns, in at least a 2 to 1 ratio of furfural to silica, heating said mixture between 250 and 275° C. at a pressure of between 150 to 180 p.s.i.g. for about 4 hours, thereby causing polymerization of the furfural on the surface of said silica, separating the product from unreacted furfural, drying, degassing at temperatures between about 200–250° C. at about 1 mm. Hg, for about ½ hour, and finally, recovering the coated product.

4. A process for producing finely divided organophilic clay comprising the steps of mixing furfural with a kaolin type clay in comminuted form, and having a particle size in the range of from 20 to 40 millimicrons and from 1 to 5 microns heating said mixture to an elevated temperature between 175 to 300° C. and maintaining a pressure of at least 20 p.s.i.g. for a time sufficient to cause polymerization of the furfural on the surface of said clay, separating the finely divided organophilic clay product from unreacted furfural, drying, degassing at an elevated temperature under reduced pressure, and finally, recovering the coated product.

5. A process for producing finely divided organophilic clay comprising the steps of mixing furfural with a kaolin type clay, in comminuted form and having a particle size in the range of from 20 to 40 millimicrons and from 1 to 5 microns, in at least a 1.3 to 1 ratio of furfural to clay, heating said mixture at temperatures between 175 and 300° C. at a pressure of at least 100 p.s.i.g. for 2 to 8 hours thereby causing polymerization of the furfural on the surface of said clay, separating the finely divided organophilic clay product from the unreacted furfural, drying, degassing at an elevated temperature by treatment with unreactive gases and finally recovering the coated product.

6. A process for producing finely divided organophilic clay comprising the steps of mixing furfural with a kaolin type clay, in comminuted form and having a particle size in the range of from 20 to 40 millimicrons and from 1 to 5 microns, in at least a 1.3 to 1 ratio of furfural to clay, heating said mixture between 250 and 275° C. at a pressure between 150 to 180 p.s.i.g. for about 4 hours thereby causing polymerization of the furfural on the surface of said clay, separating the product from unreacted furfural, drying, degassing at temperatures between about 200 and 250° C. at about 1 mm. Hg for about ½-hour, and finally, recovering the coated product.

7. A finely divided organophilic silica having a particle size in the range of from 20 to 40 millimicrons and from 1 to 5 microns consisting of a silica substrate coated with polymerized furfural.

8. A finely divided organophilic kaolin-type clay having a particle size in the range of from 20 to 40 millimicrons and from 1 to 5 microns consisting of a kaolin-type clay substrate coated with polymerized furfural.

References Cited

UNITED STATES PATENTS

| | | | |
|---|---|---|---|
| 2,174,887 | 10/1939 | Kiefer | 117—61 |
| 2,314,181 | 3/1943 | Winterkorn | 117—100 |
| 2,333,151 | 11/1943 | Campbell | 117—161 |
| 2,345,966 | 4/1944 | Fiedler et al. | 117—161 |
| 2,739,076 | 3/1956 | Iler | 117—100 |
| 2,755,204 | 7/1956 | Carter | 210—67 |
| 2,876,133 | 3/1959 | Iler et al. | 117—100 |
| 2,909,450 | 10/1959 | Goldstein | 117—161 |
| 3,041,156 | 6/1962 | Rowse et al. | 117—100 |
| 3,068,185 | 12/1962 | Stamberger | 117—100 |

WILLIAM D. MARTIN, *Primary Examiner.*